United States Patent Office 3,663,489
Patented May 16, 1972

3,663,489
HEAT-RESISTANT PHENOLIC RESIN FOAM FORMING COMPOSITION
Thomas J. Byerley, Shawnee Mission, Kans., and Howard W. Christie, Kansas City, Mo., assignors to Butler Manufacturing Company, Kansas City, Mo.
No Drawing. Filed Feb. 19, 1970, Ser. No. 12,845
Int. Cl. C08j 1/18
U.S. Cl. 260—2.5 F  3 Claims

ABSTRACT OF THE DISCLOSURE

A heat-resistant phenolic resin composition comprising a phenolaldehyde resole and a boron containing compound formed by reacting boric acid or boric oxide with glyoxal, glyoxal trimer, substituted glyoxal and glyoxal derivatives. These reaction products produce an "acid like" cure of the resin as they are weak acids in the presence of the water in the phenoleformaldehyde resole.

The resin may be made into coatings, castings or, by the addition of a surfactant and a blowing agent, foams may be produced.

BACKGROUND OF THE INVENTION

Field of the invention

The present invention contemplates novel and unique phenolic resin compositions which, when made into castings and exposed to flame or to heat in the range of 400–500° F., they will not shatter or ignite and, when made into foam and exposed to flame for at least five minutes, will not ingnite or punk.

Description of the prior art

Much work has been done in industry to produce phenolaldehyde resole resins which, when cast or foamed, will produce products which are resistant to heat and direct flame.

Even though there has been much work with varying temperatures, pressures and catalysts, the industry has not been able to mold at low pressures a phenolic casting which has heat and flame resistance. It has been observed that, although acids in general are effective as catalysts in causing rapid hardening of phenolaldehyde resins, these resins, when hardened, produce a product which will explode when exposed to flame or high heat.

There has also been observed in the industry a difficulty in producing foams from phenolaldehyde resole resins which will not ignite or punk when exposed to flame. Heretofore, it has been known to prepare some structures from aqueous phenolaldehyde resole resins using an acid catalyst. The reaction is exothermic which converts the water present to steam. The resin is converted to an infusible condition entrapping the steam which forms the cellular structure of the foam. The resin foams produced after inferior in their resistance to heat in that they have an occasionally dramatic tendency to destroy themselves by a punking reaction on exposure to temperatures in excess of 250° F. in the presence of air. By punking, is meant the property of continuing to glow, smolder or otherwise combust without a visible flame.

The punking of these foams limits their use as thermal insulation. The addition of conventional flame retarding additives such as organic phosphorus or halogen containing compounds to these foams does not control punking.

It has even been known to use boric acid and boric anhydride with alpha-hydroxy carboxylic acids, such as hydroxyacetic, lactic or oxalic, to achieve some measure of nonpunking as set forth in the Quarles Pat. 3,298,973 (U.S.). Even when using large amounts of boron in lactic acid-catalyzed foams, punking is not completely controlled.

It is apparent, therefore, that there is a need in the industry for heat-resistant phenolic resin compositions which will produce castings having the qualities of heat and flame resistance and which will produce foams by the addition of surfactants and blowing agents which will have a high degree of punk proofness and which are capable of being produced easily and economically.

SUMMARY OF THE INVENTION

It is, accordingly, one object of the present invention to provide a new heat-resistant phenolaldehyde resole resin which, when formed into castings and exposed to flame at temperatures in the range of 1400–1500° F., will not ignite or explode.

Another object of the invention is to produce a new heat-resistant phenolic resole resin composition which, when foamed and exposed to direct flame, will not punk or burn.

Yet another object of the invention residues in a novel heat-resistant phenolic foam composition containing a phenolaldehyde resole resin, an acid catalyst and a boron containing compounds formed by reacting boron with glyoxal, glyoxal trimer, substituted glyoxals and glyoxal, gloxal trimer, supstituted glyoxals and glyoxal punk.

A further object of the instance invention resides in a novel heat-resistant flame retardant phenolic casting composition containing a phenolaldehyde resole resin and an acid catalyst, and a boron contaniing compound formed by reacting boron with glyoxal trimer, substituted glyoxals and glyoxal derivatives which will not ignite or explode when exposed to temperatures up to 500° F. or to direct flame.

A still further object of the instant invention resides in a novel catalyst for phenolaldehyde resole resins formed by reacting boric acid or boric oxide with glyoxal trimer. This catalyst will produce heat-resistant castings or foams.

Another object of the instant invention results in a novel catalyst for phenolaldehyde resole resins with glyoxal, glyoxal trimer, substituted glyoxal and glyoxal derivatives that will produce cured castings or foams that are noncorrosive to mild steel sheet.

These and other advantages of the present invention will become apparent from the following description and examples.

In accordance with the above objects, it has been discovered that phenolic casting compositions which are heat and flame resistance can be made by adding certain boron complexes to phenolaldehyde resole resins.

It has further been found that by adding to the above resins containing these boron complexes a surfactant and a blowing agent, a high flame and heat-resistant phenolic foam can be produced.

The boron complexes comprises the reaction product of boric acid or boric oxide with glyoxal, glyoxal trimer, substituted glyoxal, and glyoxal derivatives. Some of the glyoxal compounds contemplated by the instant invention are glyoxal; glyoxal trimer; pyruvic aldehyde; diacetyl; acetylene monourein; disodium-2,3,5,6-tetrahydroxypiperazine - 1,4-disulphonate; 1,4-diformyl-2,3,5,6-tetrahydroxypiperazine and diglyoxal-urea adduct.

The sulphonated piperazine compounds are formed by reacting glyoxal with sodium sulfamate. The diformyl tetrahydroxypiperazines are formed by reacting glyoxal with formamide. Urea adducts of glyoxal are formed by the reaction of urea with glyoxal.

In both the casting compositions and in the foam compositions, the boron complex is present in an amount of from 10 to 100 parts by weight based on 100 parts by weight of phenolaldehyde resole. In all cases, except when the glyoxal trimer boron complex is used, there is added anywhere from 3 to 16 parts by weight of an acid catalyst. Preferably, the acid catalyst is 85% phosphoric acid.

When foams are desired, from 1 to 4 parts by weight of a surfactant and from 2 to 18 parts by weight of a blowing agent, such as carbon tetrachloride, per 100 parts of resole, are used.

DESCRIPTION OF THE PREFERRED EMBODIMENTS

In accordance with the present invention, there has been found a new class of materials for forming phenolic castings and foams that possess unusual resistance to flame and heat and, in the case of foam, to punking when exposed to flame. The heat-resistant materials or additives in the present invention are certain boron containing complexes. These boron containing complexes are the reaction products of boric acid or boric oxide with certain glyoxal compounds among which are glyoxal, glyoxal trimer, substituted glyoxals, and glyoxal derivatives. The following are some of the compounds which can be complexed with boric acid or oxide:

Glyoxal

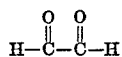

Pyruvic Aldehyde

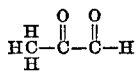

Diacetyl

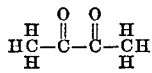

Glyoxal Trimer

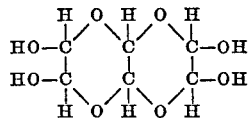

Disodium-2,3,5,6-tetrahydroxypiperazine-1,4-disulphonate

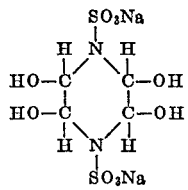

1,4-diformyl-2,3,5,6-tetrahydroxypiperazine

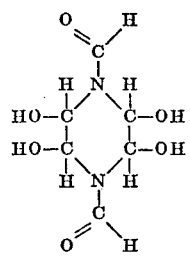

The Reaction Products of Urea with Glyoxal Acetylene Monourein

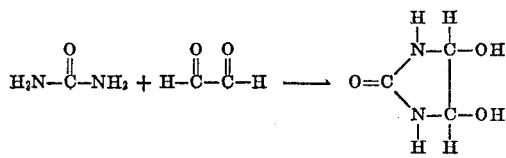

Diglyoxal-urea adduct

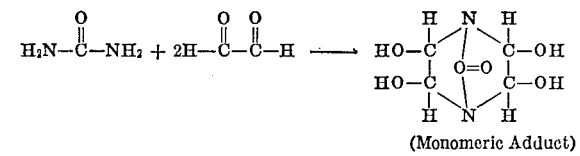

(Monomeric Adduct)

or

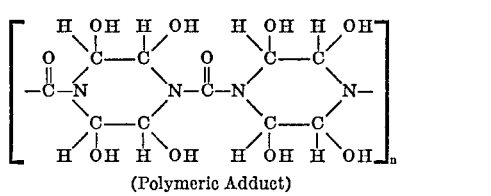

(Polymeric Adduct)

Any compound that reacts with glyoxal to yield a 1,2-glycol is a potential catalyst precursor for the boron-containing phenolic resins. Ethylene glycol reacts with glyoxal to give 2,3-dihydroxydioxane. Glyoxal and glycerine yield a water-soluble resin, as do glyoxal and pentaerythritol. The preparation of sulfonate substituted piperazines by reaction of glyoxal with sodium sulfamate amides is known (Dinwoodie, A. H. et al., J. Chem. Soc. (C), 1967, 496–497) as is the preparation diformyl-tetrahydroxypiperazines from formamide and glyoxal (Dinwoodie, A. H. et al., J. Chem. Soc. (C), 1967, 491–495). Reaction of urea with glyoxal is disclosed in British Pat. 77,287 (1954) "Ureins of Glyoxal."

Complexes between boric acid or oxide and the above compounds are in the hydrated state. Preparation of these complexes can be performed in aqueous systems to yield finely powdered materials. Reaction of any of the above compounds with boric acid or oxide in solution forms an acidic complex capable of producing foams or castings from a phenolaldehyde resole which will withstand extended exposure to flame at 1400–1500° F., without burning or punking. The foams produced by the instant invention are nonburning and nonpunking when exposed to flame in the modified Butler Chimney test for more than 5 minutes.

With reference to these foams, there has been some difficulty in determining their heat-resistance. Normally, phenolic foams undergo combustion in a manner such that normal testing methods are not suitable for distinguishing between the nonburning and nonpunking foams. A.S.T.M. test methods D–1692 and D–653–44, for example, are not intended nor sensitive enough to characterize the nonpunking foams. Consequently, it has been necessary to devise a test to measure that characteristic. The test used is basically a modification of the Butler Chimney Flammability Test for Cellular Plastics which is described in detail in the Journal of Cellular Plastics, November 1967.

In the modified Chimney Test, the chimney was doubled in cross-sectional dimensions, and a Pyrex glass plate was used as the front observation window. The Tirrill burner was operated at full gas flow with the air mixture adjusted to produce a 1-inch long blue inner cone. The test specimens (1.50–1.75 inches square and at least 4 inches long) were placed in the chimney so that the tip of the flame touched the bottom of the sample. An iron-constantan thermocouple was inserted into the length of the sample to a depth that left 1 inch remaining between the tip of the thermocouple and the bottom of the sample. Flame exposure time was held constant at 300 seconds (5 minutes). The temperature rise was recorded up to a limit of 500° C. using a Leeds and Northrup recorder. The occurrence of any punking was thus quite evident as the initial temperature would exceed 500° C. in a short time. During punking, internal temperatures could reach as high as 1800° F. (980° C.). This test procedure provided to be quite sensitive both to the punking reaction and to the insulating and fire resistance of the foams under test.

Contemplated within the phenolaldehydes that may be used are those prepared by reacting one mole of at least one monohydric phenol selected from the group consisting of phenol (monohydroxy benzene), cresol, xylenol, and cresylic acid with from one to three moles of at least one aldehyde selected from the group consisting of formaldehyde, acetaldehyde, furfuraldehyde, and reactive polymers of formaldehyde such as paraformaldehyde. The reaction preferably is carried out in the presence of substantial quantities of water and in the presence of from 0.5% to 3.5%, based on the weight of the phenol, of one or more alkaline catalysts. Any conventional alkaline catalyst suitable for prompting the reaction of phenol and formaldehyde to give a phenolic resol may be employed. Examples of such catalysts are sodium hydroxide, potassium hydroxide, barium hydroxide, calcium hydroxide, calcium oxide, sodium carbonate, and sodium bicarbonate. It will be appreciated that other alkali and alkaline earth metal oxides, hydroxides, carbonates and bicarbonates may be employed.

With regard to foams, the blowing agents that may be used may be any of the halogenated alkanes, or any inert volatile agent which will be volatile from about room temperature to 100° C. In some cases, an accelerator may be used such as a highly reactive polyphenol such as resorcinol, catechol, cresol, or xylenol.

In forming phenolaldehyde foams, sometimes it is efficacious to use a surfactant for aiding foaming. The surfactant used for aiding foaming can be any of the nonionic types such as the polyethers and polyalcohols, such as condensation products of alkylene oxides (such as ethylene oxides and propylene oxide) with alkyl phenols, fatty acids, alkyl silanes and silicones and like materials, as is exemplified by such products as octadecyl phenolethylene oxide, decyl phenolethylene oxide sulfate and the low polymers of such materials as polyoxyethylene dodecyl phenol, octyl phenol polyethylene glycol ether, ricinoleic acid, polyethylene glycolate, stearic acid poly-oxyethylene glycolates and silimar polyoxyethylated fatty acids and vegetable oils as well as polyoxyethylated fatty acid esters as polyoxyethylene sorbitan monolaurate, polyoxyethylene sorbitan tristearate, polyoxypropylene sorbitan monolaurate, polyoxy(propylene-ethylene) sorbitan monolaurate, and polyoxyethylene sorbitan pentaoleate; poly-oxyethylene sorbitan monopalmitate, the siloxane-oxyalkylene block copolymers such as those containing a Si—C linkage between the siloxane and oxyalkylene moieties. Typical siloxane-oxyalkylene block copolymers contain a siloxane moiety composed of recurring dimethylsiloxy groups end-blocked with monomethylsiloxy and/or trimethylsiloxy groups and an oxyalkylene moiety composed of recurring oxyethylene and/or oxypropylene groups end-blocked with alkoxy groups. Similarly useful are the quaternary ammonium compounds with at least 2 alkyl groups attached to the nitrogen atom like cetyl dimethyl benzyl ammonium chloride, octadecyl dimethyl benzyl ammonium chloride, octadecenol-9-dimethyl ethyl ammonium bromide, and di-isobutylphenoxyethoxy ethyl dimethyl benzyl ammonium chloride and sorbitan fatty acid esters such as sorbitan monolaurate, sorbitan monopalmitate, sorbitan monostearate, sorbitan trioleate and like esters.

The following are examples of the preparation of the boron containing glyoxal compound complexes and their use in foams.

EXAMPLE I

Preparation of the glyoxal-boric acid complex, 1 to 1 mole ratio

To one mole of aqueous 40% glyoxal was added one mole of powdered boric acid. The mixture was heated at 85–90° C. for one hour and cooled to room temperature and filtered to yield 85 g. of a fine, white powder after drying. The material charred on exposure to heat indicating a high organic content. This was 85% of theory.

Preparation of a phenolic foam using the above complex

Initial attempts to prepare foams using the complex alone showed that the complex was not quite acidic enough to produce a rapid cure. The foam would form and then collapse before polymerization had proceeded far enough to make a rigid structure. The incorporation of small quantities of phosphoric acid produced a sufficiently rapid cure. Given below is a typical example of foam compositions.

| | Parts by wt. |
|---|---|
| Phenol-formaldehyde resole | 100 |
| Surfactant (G.E.'s SF–1109) | 3 |
| Blowing agent, CHCl$_3$ | 10 |
| 1 to 1 glyoxal-boric acid complex | 33 |
| Phosphoric acid, 85% | 4 |

The components listed above were combined in that order and mixed for 40 seconds and the mixture placed in a forced air oven at 100° C. The foam was slow in rising but retained a good skin with no evidence of collapse or rupture. Total cure time was 15 minutes.

The foam produced from the above formulation was nearly pure white, which is unusual for a phenolic foam.

The flame and punk resistance of the foam was evaluated by subjecting it to the modified Chimney test as previously described. On testing there was essentially no flame or smoke observed. There was no indication of punking and the char depth was less than one-quarter inch in depth with a discolored depth of less than one-half inch. The density of the foam was 3.8 lbs./ft.$^3$.

EXAMPLE II

Preparation of 2 to 1 boric acid-glyoxal complexes

To one mole of 40% aqueous glyoxal was added 150 ml. of acetone and then one mole of boric oxide with stirring. The heat of reaction was sufficient to make the mixture boil. After cooling to room temperature, the crystalline product was filtered to yield 134 g. (60% of theory) of a very white product. This product produced a black char on pyrolysis. This complex was used just as the 1 to 1 complexes in the same proportions to produce phenolic foams that were uniquely resistant to flame and heat.

EXAMPLE III

Preparation of a 1 to 1 pyruvic aldehyde-boric acid complex

To a stirred solution of 1.0 mole of 43% aqueous pyruvic aldehyde was added 1.0 mole of boric acid. The mixture was heated at 85–90° C. until homogeneous. After the mixture had stood at room temperature for 16 hours, it was filtered and the filtrate was washed with small quantities of ice cold distilled water. The filtrate was dried to yield a pale orange powder. On pyrolysis the powder charred showing a substantial organic content. The total yield was approximately 78% of theory.

Preparation of a phenolic foam using the pyruvic aldehyde-boric acid complex

We found that it was necessary to use small quantities of phosphoric acid in order to produce a useable foam just as with the glyoxal-boric acid complex. A typical formulation is given below.

| | Parts by wt. |
|---|---|
| Phenol-formaldehyde resole | 100 |
| Surfactant (G.E.'s SF–1109) | 3 |
| Blowing agent, CHCl$_3$ | 10 |
| Pyruvic aldehyde-boric acid complex | 33 |
| Phosphoric acid, 85% | 4 |

The components given above were combined in that order and mixed for 40 seconds and the mixture was placed in a forced air oven at 95° C. The foam was slow in rising but there was no evidence of collapse or rupture. The density of the cured foam was 2.5 lbs./ft.$^3$.

On exposure to the flammability test previously described, there was no indication of burning, punking, or spalling. There was essentially no flame or smoke observed. The char damage extended approximately one inch into the test specimen.

EXAMPLE IV

Preparation of the diacetyl-boric acid complex

One mole (85 g.) diacetyl was slowly added to 2 moles (36 g.) water in 200 ml. of acetone. To this mixture was added one mole (62 g.) of powdered boric acid with stirring. The slurry was heated to reflux for one hour, cooled and filtered to yield 69 g. of a pale yellow crystalline material. The yield was 44% of theory. On pyrolysis this material gave a dark char indicating a high organic content.

Again we have found it necessary to add small quantities of phosphoric acid in order to produce a useable foam. The diacetyl-boric acid complex was not as reactive as glyoxal-boric acid complex. Listed below is a typical foam formulation:

|  | Parts by wt. |
| --- | --- |
| Phenol-formaldehyde resole | 100 |
| Surfactant, (G.E.'s SF–1109) | 3 |
| Blowing agent, $CHCl_3$ | 15 |
| Diacetyl-boric acid complex | 50 |
| Phosphoric acid, 85% | 5 |

The components listed above were combined in that order and mixed for 40 seconds and then placed in a forced air oven at 90–95° C. The foam was slow in rising but there was no evidence of collapse or rupture. On exposure to the flammability test previously described, there was no indication of burning, punking or spalling. Essentially, no smoke or flame was noted. Char depth was approximately 0.75 inch.

EXAMPLE V

Glyoxal trimer complexes

Glyoxal trimer, in its crystalline form produces an acid complex with boric acid or oxide which will foam and cure a phenolformaldehyde resole. A typical formulation is given below.

|  | Parts by wt. |
| --- | --- |
| Phenol-formaldehyde resole | 100 |
| Chloroform (blowing agent) | 4.5 |
| Surfactant, (G.E.'s SF–1109) | 3 |
| Resorcinol | 6 |
| Poly(vinyl alcohol) as a 12% aqueous solution (i.e. Du Pont's Elvanol 52–22) | 3 |
| Crystalline glyoxal trimer | 33 |
| Powdered boric acid | 40 |
| or |  |
| —200 mesh boric oxide | 20 |

These components were combined in the order listed above and mixed for 40 seconds and foamed in a forced air oven at 165° F. The foam obtained had good cell structure and a density of approximately 4 lbs./ft.³. When a 1.5-inch by 1.5-inch by 10-inches long sample was exposed to the flammability test previously described for 5 minutes, very little flame was observed; wegiht loss was less than 10% and the char depth was less than 0.5 inch.

EXAMPLE V–A

Preparation of noncorrosive foam in sandwich panel

A sandwich panel, 6 x 6 x 2-in. was prepared with 6 x 6-in., 24-gauge steel skins and a foam core with the composition listed in Examples V. For comparison, a second panel was made with oxalic acid in place of the glyoxal trimer. The use of oxalic acid in combination with boric acid is described in U.S. Pat. 3,298,973 (Quarles). The panels were exposed in a chamber at 100° F., and 100% R.H. for a month. Subsequent examination showed that the foam-to-steel bond in both panels remained intact. When the skins were forcibly removed, however, the surfaces that had been in contact with the oxalic acid-containing foam were severely corroded. The skin surfaces that had been in contact with the glyoxal trimer-containing foam were not corroded.

EXAMPLE VI

Disodium-2,3,5,6-tetrahydroxypiperazine-1,4-disulphonate

This tetrahydroxy compound, when complexed with boric acid or oxide, will cure a phenolic resin but is slightly less reactive than the glyoxal trimer complex and requires the addition of small quantities of phosphoric acid to make a useable foam structure. The following formulation produced a satisfactory foam.

|  | Parts by wt. |
| --- | --- |
| Phenol-formaldehyde resole | 100 |
| Surfactant, (G.E.'s SF–1109) | 3 |
| Chloroform (blowing agent) | 9 |
| Disodium - 2,3,5,6 - tetrahydroxypiperazine-1,4-disulphonate | 40 |
| Powdered boric acid | 30 |
| or |  |
| —200 mesh boric oxide | 20 |
| Phosphonic acid, 85% | 8 |

The components listed above were combined in that order and mixed for 40 seconds and foamed in a forced air oven at 180° F. The foam rose and cured in 10 to 15 minutes and had a density of 4.7 lbs./ft.³. On exposure to the flammability test previously described, there was essentially no flame or smoke and the test sample did not punk or spall. The char depth was approximately 0.3 inch with foam discoloration being 0.5 inch deep. Weight loss was less than 10%.

EXAMPLE VII 1,4-diformyl-2,3,5,6-tetrahydroxypiperazine

This compound in conjunction with small quantities of phosphoric acid produced satisfactory foams. The following is a typical example of those formulations found useable.

|  | Parts by wt. |
| --- | --- |
| Phenol-formaldehyde resole | 100 |
| Surfactant (G.E.'s SF–1109) | 3 |
| Chloroform (blowing agent) | 4.5 |
| 1,4-diformyl-2,3,5,6-tetrahydroxypiperazine | 33 |
| Powdered boric acid | 25 |
| or |  |
| —200 mesh boric oxide | 15 |
| Phosphoric acid, 85% | 8 |

The components listed above were combined in that order and were mixed for 40 seconds and foamed in a forced air oven requiring 15 minutes for cure. A foam of 3.6 lbs./ft.³ density was obtained. On exposure to the flammability test outlined above, very little smoke or flame was observed and the test sample did not burn, punk or spall in 5 minutes. The char depth was approximately 0.2 inch while discoloration was about 0.75 inch deep.

EXAMPLE VIII

Acetylene monourein

This compound, which was prepared by the reaction of equimolar amounts of urea and glyoxal, was a crystalline solid. It could be used in the same manner as the previous compounds in foam preparation. A typical formulation is given below.

|  | Parts by wt. |
| --- | --- |
| Phenol-formaldehyde resole | 100 |
| Surfactant (G.E.'s SF–1109) | 3 |
| Blowing agent, chloroform | 9 |
| Acetylene monourein | 40 |
| Boric oxide, —200 mesh | 15 | or
Powdered boric acid _____ 30
Phosphoric acid, 85% _____ 8

The components listed above were combined in that order and mixed for 40 seconds and foamed in a forced air oven at 180° F. for 15 minutes to produce a foam. The sample did not burn, punk or spall, and the char depth was less than 0.5 inch after the 5 minute flammability test.

EXAMPLE IX

Reaction product of one mole urea and two moles glyoxal

This product, which may be a mixture of the heterocyclic monomer and polymer described previously is a viscous syrup and can be readily used in producing phenolic foams in conjunction with boric oxide or acid and small quantities of phosphoric acid. Listed below is a typical formulation used to produce a satisfactory flame and heat resistant phenolic foam.

Parts by wt.
Phenol-formaldehyde resole _____ 100
Surfactant (G.E.'s SF–1109) _____ 3
Blowing agent, chloroform _____ 9
Urea-glyoxal syrup _____ 33
Boric acid powder _____ 30
or
–200 mesh boric oxide _____ 15
Phosphoric acid _____ 8

Using the same mixing techniques outlined above, a foam was produced in 15 minutes at 180° F. with a density of 3.1 lbs./ft.$^3$. The chimney flammability tests (5 minutes) indicated that the foam did not smoke, burn, punk or spall. The char depth was approximately 0.4 inch.

EXAMPLE X

One of the unique properties of foams made from selected phenolaldehyde resoles using complexes of glyoxal and boric acid as catalysts, was their color. Essentially, white foams were produced from the boron resole. It was also possible to produce white to lightly colored castings using the same compositions. A typical formulation is shown below:

Parts by wt.
Resole _____ 100
1:1 glyoxal-boric acid complex _____ 40
Chloroform _____ 9
Surfactant (G.E.'s SF–1109) _____ 3
Phosphoric acid, 85% _____ 8

The foam produced at a temperature of 190° F. was chalk white with good cell structure and a density of about 4 lbs./ft.$^3$. On exposure to ultraviolet light from a General Electric H–100 broad band lamp at a 6 in. distance for 64 hrs. only a slight yellowing of the surface of the foam was produced.

It is normally quite difficult to make a lightly colored, cured phenolic resin. Moreover, these phenolics that are light-colored turn dark very rapidly on exposure to ultraviolet light.

The following are examples of the boron-containing glyoxal complexes being used in castings. The complexes were formed in the same manner as shown above for the foams. The castings were made using 100 g. of a phenolaldehyde resin containing 2 to 12% water and 0 to 4 g./100 ml. free formaldehyde. All of the castings produced by the following Examples XI through XIX did not flame or explode when exposed to flame or when heated to temperatures between 400 to 500° F.

EXAMPLE XI 1 to 1 glyoxal-boric acid complex

Parts by wt.
Phenol-formaldehyde resole _____ 100
1 to 1 glyoxal-boric acid complex _____ 33
Phosphoric acid, 85% _____ 4

EXAMPLE XII 2 to 1 glyoxal-boric acid complex

Parts by wt.
Phenol-formaldehyde resole _____ 100
2 to 1 glyoxal-boric acid complex _____ 33
Phosphoric acid, 85% _____ 4

EXAMPLE XIII

Pyruvic aldehyde-boric acid complex

Parts by wt.
Phenol-formaldehyde resole _____ 100
Pyruvic aldehyde-boric acid complex _____ 33
Phosphoric acid, 85% _____ 4

EXAMPLE XIV

Diacetyl-boric acid complex

Parts by wt.
Phenol-formaldehyde resole _____ 100
Diacetyl-boric acid complex _____ 50
Phosphoric acid, 85% _____ 5

EXAMPLE XV

Glyoxal trimer

Parts by wt.
Phenol-formaldehyde resole _____ 100
Crystalline glyoxal trimer _____ 33
Powdered boric acid _____ 40
or
–200 mesh boric oxide _____ 20

EXAMPLE XVI

Disodium-2,3,5,6-tetrahydroxypiperazine-1,4-disulphonate-boric acid complex

Parts by wt.
Phenol-formaldehyde resole _____ 100
Disodium - 2,3,5,6 - tetrahydroxypiperazine - 1,4-disulphonate _____ 40
Powdered boric acid _____ 30
or
–200 mesh boric oxide _____ 20
Phosphoric acid, 85% _____ 8

EXAMPLE XVII 1,4-diformyl-2,3,5,6-tetrahydroxypiperazine boric acid complex

Parts by wt.
Phenol-formaldehyde resole _____ 100
1,4 - diformyl - 2,3,5,6 - tetrahydroxypiperazine ____ 33
Powdered boric acid _____ 25
or
–200 mesh boric oxide _____ 15
Phosphoric acid, 85% _____ 8

EXAMPLE XVIII

Acetylene monourein-boric oxide complex

Parts by wt.
Phenol-formaldehyde resole _____ 100
Acetylene monourein _____ 40
Boric oxide, –200 mesh _____ 15
or
Powdered boric acid _____ 30
Phosphoric acid, 85% _____ 8

EXAMPLE XIX

Urea-glyoxal-boric acid complex

Parts by wt.
Phenol-formaldehyde resole _____ 100
Urea-glyoxal syrup _____ 33
Boric acid powder _____ 30
or
–200 mesh boric oxide _____ 15
Phosphoric acid _____ 8

The above examples illustrate preferred amounts of compounds in terms of parts by weight used in the various foam and casting composition. It is possible to vary the ranges of these components and still produce a useable flame and heat resistant composition. The following table sets forth the ranges which may be used for all of the components for both foams and castings (per 100 p.b.w. resole).

| | Parts by wt. |
|---|---|
| Surfactant * | 1–4 |
| Blowing agent, CHCl$_3$ * | 2–12 |
| Boron containing glyoxal-like compound complexes | 10–100 |
| Phosphoric acid, 85% | 3–16 |

*Only in foams.

As has been set forth above and evidenced by the specific examples, novel heat-resistant phenolic resole resin compositions have been produced which are capable of being formed into castings or by the addition of surfactants and blowing agents are capable of forming foams.

These resin compositions can be molded into products, which can contain fillers, pigments or reinforcing material such as mineral fibers, glass fibers, etc. The resinous materials are also capable of being used to impregnate substrates or of being attached thereto. The foams are capable of being used in any instances wherein heat-resistance is desirable, such as insulation.

Having thus described the compositions of the invention in terms of their preferred embodiments as set forth in the descripiton and the examples of the aforesaid specification, it is apparent to those skilled in the art that various changes and modifications can be made in the compositions without departing from the scope of the invention. Thus, for example, it is apparent that, although only certain substituted glyoxal compounds have been set forth, many 1,2-dicarbonyl compounds can be used. It is also contemplated that other glyoxal derivatives can be used.

Any acid catalyst or mixture of acid catalysts may be used in place of the phosphoric acid shown in the previous examples.

We claim:

1. A heat-resistant phenolic foam forming composition comprising 100 parts by weight of a phenolic resole resin, from 33 to 100 parts by weight of a boron-containing complex formed by reacting a boron compound selected from the group consisting of boric acid and boric oxide with a member of the group consisting of glyoxal, glyoxal trimer, pyruvic aldehyde, diacetyl, disodium-2,3,5,6 - tetrahydroxy-piperazine - 1,4 - disulphonate, 1,4-diformyl-2,3,5,6-tetrahydroxypiperazine, acetylene monourein and diglyoxal-urea adduct, from 1 to 4 parts by weight of a surfactant, from 2 to 18 parts by weight of a blowing agent, and from 0 to 16 parts by weight of an acid catalyst.

2. The composition of claim 1 wherein the acid catalyst is phosphoric acid.

3. A method of forming a heat-resistant phenolic resin composition comprising adding to a phenolaldehyde 100 parts by weight of resole resin from 33 to 100 parts by weight of a boron-containing complex formed by reacting a boron compound selected from the groups consisting of boric acid and boric oxide with a member of the group consisting of glyoxal, glyoxal trimer, pyruvic aldehyde, diacetyl, disodium - 2,3,5,6 - tetrahydroxy-piperazine-1,4-disulphonate, 1,4 - diformyl - 2,3,5,6-tetrahydroxypiperazine, acetylene monourein and diglyoxal-urea adduct from 1 to 4 parts by weight of a surfactant, from 2 to 18 parts by weight of a blowing agent and from 0 to 16 parts by weight of an acid catalyst.

References Cited

UNITED STATES PATENTS 3,298,973   1/1967   Quarles et al. _____ 260—2.5 F

FOREIGN PATENTS 824,251   11/1959   Great Britain _____ 260—59

SAMUEL H. BLECH, Primary Examiner

M. FOELAK, Assistant Examiner

U.S. Cl. X.R.

260—57 R, 59